June 17, 1930.  G. W. EDWARDS  1,764,158
MACHINE FOR EXTRACTING JUICE FROM CITRUS FRUITS
Filed June 8, 1928   2 Sheets-Sheet 1
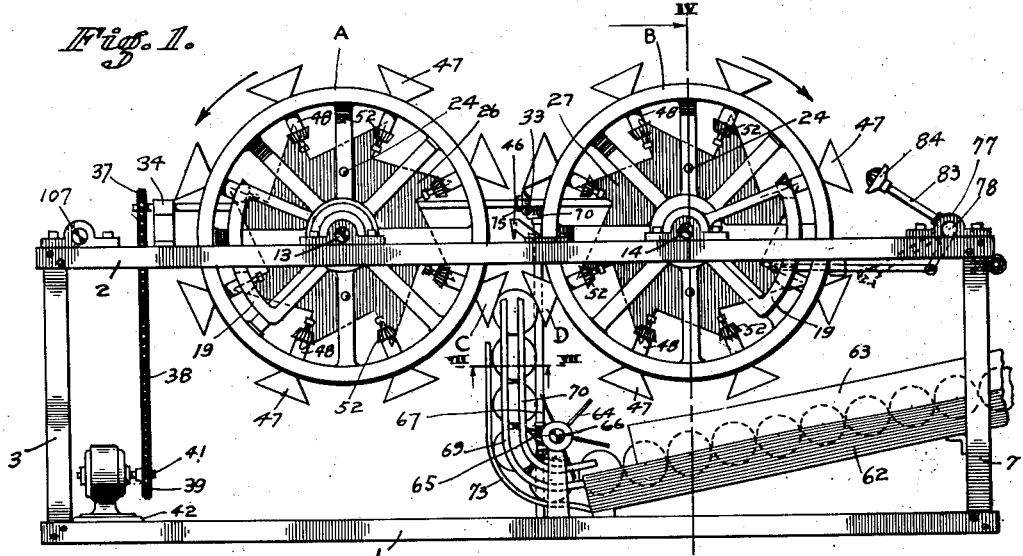
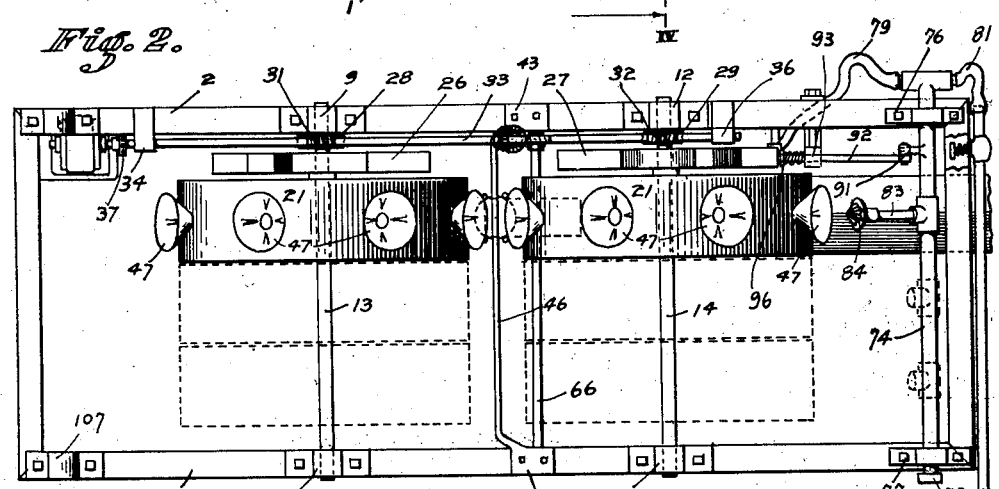
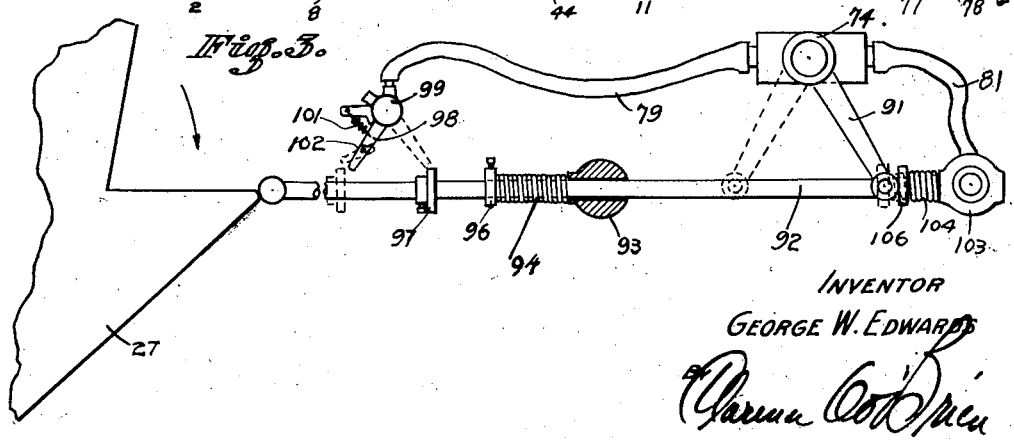
INVENTOR
GEORGE W. EDWARDS
ATTORNEY June 17, 1930.   G. W. EDWARDS   1,764,158
MACHINE FOR EXTRACTING JUICE FROM CITRUS FRUITS
Filed June 8, 1928    2 Sheets-Sheet 2
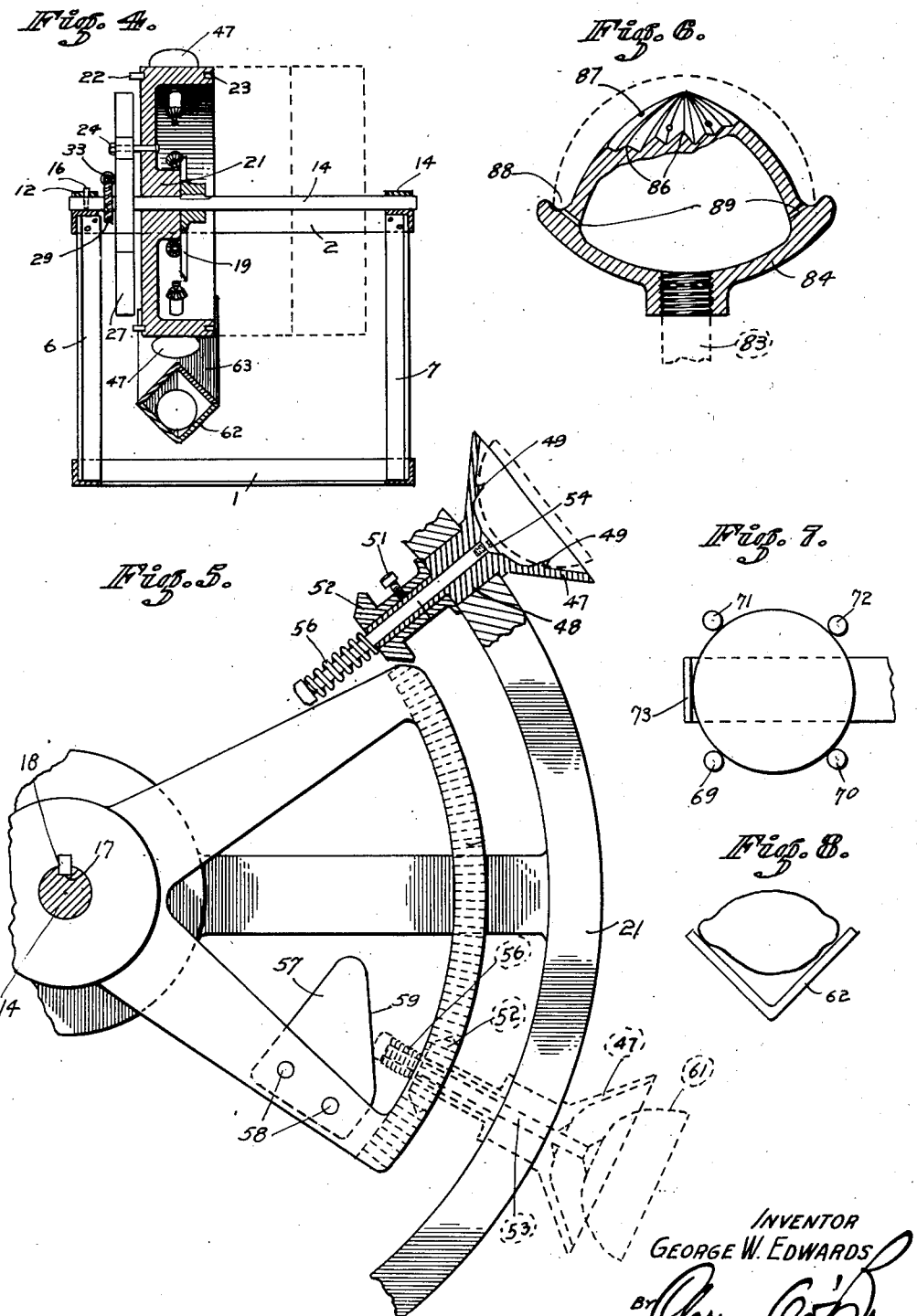
INVENTOR
GEORGE W. EDWARDS
ATTORNEY.

Patented June 17, 1930

1,764,158

UNITED STATES PATENT OFFICE

GEORGE W. EDWARDS, OF OAKLAND, CALIFORNIA, ASSIGNOR TO SUNSET GOLD PACKING COMPANY, OF OAKLAND, CALIFORNIA, A CORPORATION OF WEST VIRGINIA

MACHINE FOR EXTRACTING JUICE FROM CITRUS FRUITS

Application filed June 8, 1928. Serial No. 283,964.

The present invention is a machine for extracting juice from citrus fruits.

The primary object of the invention is to provide a machine into which may be fed by gravity oranges, lemons, grapefruit and the like and which will halve the fruit and extract the juice from each half, rejecting the peel after the juice is extracted.

Another object is to provide a machine for the purpose stated which is of the rotary type and consequently rapid in action and one in which the component parts are interchangeable and of such unit construction that the capacity of the machine may be increased by the addition of similar parts.

A further object of the invention is to provide a machine in which vacuum is used to extract the juice as in addition to being an efficient extraction medium it is also a useful factor in the treatment of citrus juices which must be preserved or treated rapidly and not be subjected to the atmosphere.

Another object is to provide a machine which will accomplish the extraction of juice without causing same to mix with the pulp, peel or oil in the by-products.

It is a well known fact that oranges and lemons cannot be successfully squeezed in their entirety without rendering the juice unsuitable for bottling or preserving.

In this specification and the annexed drawings, the invention is illustrated in the form considered to be the best, but it is to be understood that the invention is not limited to such form, because it may be embodied in other forms and it is also to be understood that in and by claims following the description it is desired to cover the invention in whatever form it may be embodied.

In the accompanying two sheets of drawings Figure 1 is a side elevation of my machine, Figure 2 is a top plan view of Figure 1, Figure 3 is a detail showing valves controlled by a cam driven reciprocating rod, Figure 4 is a vertical section on the line 4—4 of Figure 1, Figure 5 is an enlarged detail showing a segmental rack and a cam carried thereon, Figure 6 is a side view partly in section of a squeezer head, Figure 7 is a section taken on the line 7—7 of Figure 1, Figure 8 is a section of trough showing a lemon therein.

Referring to the drawings the numeral 1 indicates a square frame of angle iron which serves as a base for my machine. A similar frame 2 forms a top and is connected with the base 1 by corner pieces 3, 4, 6 and 7. The structure may be suitably braced, but bracing is dispensed with here to avoid complicating the drawings.

On the sides of the top frame 2 are secured bearings 8, 9, 11 and 12, in which are shafts 13 and 14 fixed against rotation in said bearings by pins such as 16, Figure 4.

Both shafts are provided with keyways as indicated at 17, Figure 5. Keyed to the shafts 13 and 14 as shown at 18, Figure 5, are a series of similar segmental racks 19 the purpose of which will be hereinafter explained.

The working parts of my machine are carried on a series of pair of wheels 21 similar in shape and function, one of which is shown in vertical cross section in Figure 4.

These wheels are freely rotatable on shafts 13 and 14 and are adapted to drive one another through the medium of pins 22 near their outer periphery each of which engages a bore 23 on the next adjacent wheel, so that when several wheels are placed side by side as shown in dotted position in Figure 2 and Figure 4 all will rotate together when one is driven.

The wheels thus described are driven on each of the shafts 13 and 14 but those on shaft 13 (marked A in Figure 1) are driven in counter clockwise direction and those on shaft 14 (marked B) are driven in the opposite direction as indicated by arrows.

Secured to the outer pair of wheels 21 as by bolts 24 are cam wheels 26, 27 to which are secured right and left worm wheels 28 and 29 respectively. These worm wheels are driven by worms 31, and 32 secured to a shaft 33 journaled in bearings 34 and 36 secured to the top frame 2.

The shaft 33 is driven by a sprocket wheel 37 secured thereto and rotated by an endless chain 38 which also passes over a sprocket wheel 39 secured to the shaft and a motor 41 seated on a platform 42 extending across the base frame 1 and secured thereto. Extending transversely across the top frame 2 and secured thereto as shown at 43, 44 is a knife 46 the cutting edge of which extends downwardly.

This knife is placed midway between the wheels A and B and its function is to split the fruit in halves when the said fruit is passed upwardly by the wheels, one half going each way over the upper part of said wheels.

In Figure 4, it will be seen that the rim of each of the wheels 21 overhangs the hub, the spokes being on the side of the rim. This is to afford clearance on each wheel for a segmental rack 19 and to provide working room at the center of the rim for funnel shaped members 47 best shown in Figure 5.

The rims of the wheels 21 are bored radially at convenient distances on the periphery to receive stems 48 of the funnel shaped members 47, which are rotatable in said rim. The funnel end of each member 47 is provided with upstanding knife edged lugs 49 adapted to enter the peel of the fruit as the funnel is rotated against the pressure of a squeezer.

Secured as by a set screw 51 to a reduced portion of the shank of each member 47 is a bevel gear 52 adapted to rotate the funnel when the said gear encounters the segmental rack 19 during the rotation of wheel 21.

Extending through the hollow stem of each of the funnel members and slidable therein is a bolt 53 held in place by a countersunk screw 54. This bolt is normally held in the position shown in full lines in Figure 5, by an expansion spring 56 surrounding a portion of said bolt and bearing at one end against the gear 52 and at the opposite end against the head of the bolt 53.

The purpose of this bolt is to provide positive means for ejecting the rind of each half of the fruit after the juice is extracted. This is accomplished by means of a cam plate 57 secured as by bolts 58 to the segmental rack 19.

As the wheel 21 rotates on shaft 14 the gear 52 encounters the fixed rack and the funnel 47 is rotated during the extraction operation to be later described. As the wheel 21 is rotated the head of the bolt 53 encounters the cam surface 59 of plate 57 the spring 56 is compressed and bolt 53 forces the rind 61 out of the funnel.

This must be effected positively to leave the funnels driven by a worm 65 on shaft 67, which is driven by gears 70 and 75, keyed to shafts 65 and 33, respectively free to grasp the fruit when they are rotated to positions shown in Figure 1 at C and D.

The fruit (previously sorted as to size) is fed to the machine by gravity through a V-shaped trough 62 to which is removably secured a V-shaped cover 63 adapted to protect the incoming fruit from the rejected half rinds 61.

In order to time the feed of fruit with the rotation of the wheels 21 I provide paddle wheels 64 keyed to a shaft 66. As the machine is run the paddle wheels advance the fruit one at a time to be engaged at positions C and D by funnels 47.

As the fruit leaves the chute 62 it is conducted around the paddle wheel and upward by a series of rods 69, 70, 71 and 72 as shown in Figures 1 and 7. An accurate guide strip 73 assists in conducting the fruit through a vertical movement, and is secured to trough 62.

It will be seen from the description so far that when the trough 62 is filled and the fruit encounters the first paddle of wheel 64 if power is applied and the machine started the fruit will be advanced one at a time and engaged by funnels 47 at C and D whence it is carried upwardly and split by the knife 46 one half going each way on the wheels A and B. The extraction of the juice is accomplished in the following manner, a pipe 74 is rotatably journaled in bearings 76, and 77 secured to frame 2.

One end of said pipe is capped at 78, and the other end is provided with a T connection, the ends of which are provided with nipples for connection with a flexible vacuum hose 79, and a flexible compressed air hose 81. At points throughout the length of the pipe 74 corresponding with the centers of the rims of the wheels 21, as shown in Figure 2 are T connections which may be plugged when not in use.

The plug may be removed however and a pipe 83 inserted. The opposite threaded end of pipe 83 is engaged by a squeeze head 84. This head is hollow and the conoidal reamer portion is fluted as shown at 86 to facilitate the extraction of juice as a half portion of fruit is rotated thereon.

At suitable places on the flutings openings 87 are provided through which juice is drawn by vacuum through pipe 79 to a filter tank (not shown).

As a safe guard against dripping I provide an annular trough 88 around the squeezer head which is drained by vacuum through ports 89.

The pipe 74, with squeezer head attached is partially rotated in alternate directions by a rocker arm 91 suitably secured to said pipe. The rocker arm is pivotally attached to a rod 92 slidably journaled in a rocking bolt 93 secured to the frame 2.

This rod 92 is reciprocated by the cam wheel 27 against which it is normally pressed by an expansion spring 94 bearing at one end against a collar 96 secured to said rod and at the opposite end against the bolt 93.

It will be seen that when the wheel 21 is rotated, the cam wheel 27 being attached rigidly thereto will cause the rod 92 to rotate the squeezer head on the axis of pipe 74 and cause the squeezer head to engage the fruit in the funnel 47 which is rotated during such engagement.

When the point is reached where the rotation of the squeezer head 84 and wheel 21 cause the squeezer head to disengage as shown in dotted lines in Figure 1, the cam 27 releases the bolt 92 and the spring 94 returns the squeezer head to the full line position (Figure 1) for engagement with the next advancing funnel. I make use of the reciprocating movement of rod 92 to actuate valves controlling the vacuum and compressed air.

As the vacuum should be applied only during that part of the movement of the squeezer head in which it engages the fruit I use the following means for applying and releasing the vacuum. A collar 97 is secured to the rod 92 and moves with said rod to the dotted position shown in Figure 3.

When in said dotted position it will engage an arm 98 secured to the stem of a valve 99 and controlling the vacuum in pipe 79. As the rod 92 is advanced by the cam wheel 27 the arm 98 is rotated by collar 97 to a point where it slips past said collar and is returned to closed position by a spring 101. In order to allow the collar 97 to pass the arm 98 on its return for subsequent engagement I have provided a joint pivoted at 102 which makes the said arm yieldable in one direction and rigid in the other.

In order to clear the squeezer head of any pulp or obstruction to the ports 87 and 89 I give the pipe 74 a momentary impulse of compressed air after each squeezing operation and after the vacuum line has been closed.

A valve 103 is interposed on the compressed air line and is normally closed by an expansion spring 104. This valve is so positioned that the very last part of the movement of the rod 92 presses against the valve stem 106 after the arm 98 has retracted and closed the vacuum line.

It will readily be seen that I have provided a machine which will rapidly and effectively halve citrus fruit, extract the juice from same and reject the rind. Obviously the capacity may be increased materially by the duplication of the parts described on the various shafts.

I use the same apparatus for lemons with but a slight change. Lemons will gravitate in a V-shaped trough in the position shown in Figure 8. It will be seen that if presented to the machine in such a trough lemons must be given a quarter turn to meet the knife 46 for a transverse cut.

I accomplish this by twisting the rods 68, 69, 71 and 72 so that the lemon is turned ninety degrees between the paddle wheel 68 and the point where the lemon is engaged at C, D.

At 107, 108 I show bearings similar to bearings 76, 77, in which is journalled another pipe 74 with all the appliances for vacuum and compressed air heretofore described it being understood that wheel A is operated exactly as B is and the extraction thereon accomplished in the same manner. In order to avoid useless complication of the drawing the extraction mechanism is shown but once.

I claim:

1. A fruit juice extractor comprising in combination, a rotating member having means for holding sections of the fruit, a perforated hollow reamer head engageable with the fruit and suction means operatively connected with the head for drawing the juices from the fruit into the head.

2. A fruit juice extractor comprising in combination, a rotating member having means for holding sections of the fruit, a perforated hollow reamer head engageable with the fruit and a tubular support for the head having suction means operatively attached thereto for drawing the juices from the fruit into and through the head.

3. A fruit juice extractor comprising in combination, a rotating member having means for holding sections of the fruit, a perforated hollow reamer head mounted independent from the rotating member and engageable with the fruit during a predetermined period of the movement thereof and suction means operatively connected with the head for drawing the juices from the fruit into the head.

4. A fruit juice extractor comprising in combination, a rotating member having means for holding sections of the fruit, a perforated hollow reamer head engageable with the head, a pivoted tubular support for the reamer head providing a movable mounting for maintaining the head and the fruit in engagement during a predetermined period of the rotation of said member, and suction means operatively connected with said support for drawing the juices from the fruit into and through the head.

5. A fruit juice extractor comprising in combination, a rotating member having means for holding sections of the fruit, a perforated hollow reamer head movably mounted independent of the rotating member and having suction operated means associated therewith, and means operatively connecting the head with said rotating member for moving the head into and out of position for engaging the fruit at a predetermined period of its movement.

6. A fruit juice extractor comprising in combination, a rotating member having means for holding sections of the fruit, a perforated hollow reamer head engageable with the fruit, a pivoted tubular support for the reamer head providing a movable mounting for maintaining the head and the fruit in engagement during a predetermined period of the rotation of said member, suction means operatively connected with said support for drawing the juices from the fruit into and through the head and means for closing communication between the head and the suction means while said head is out of fruit engaging position.

7. A fruit juice extractor comprising in combination, a rotating member having means for holding sections of the fruit, a perforated hollow reamer head engageable with the fruit, a pivoted tubular support for the reamer head providing a movable mounting for maintaining the head and the fruit in engagement during a predetermined period of the rotation of said member, suction means operatively connected with said support for drawing the juices from the fruit into and through the head, and means for periodically interrupting communication between the head and the suction means.

8. A fruit juice extractor comprising in combination, a rotating member having means for holding sections of the fruit, a perforated hollow reamer head mounted independent from the rotating member and engageable with the fruit during a predetermined period of the movement thereof, a suction line attached to the reamer head, a cut-off valve in said line, a cam attached to said rotating member, reciprocating means operable by said cam and arranged for opening the valve while the head is in contact with the fruit, and spring means for closing said valve.

9. A fruit juice extractor comprising in combination, a rotating member having means for holding sections of the fruit, a perforated hollow reamer head mounted independent of the rotating member and engageable with the fruit during a predetermined period of the movement thereof, a cam attached to said rotating member, a suction line and a compressed air line attached to said reamer head, valves for each of said lines, spring means normally closing the valve and reciprocating means operable by said cam and releasably engaging said valve for successively opening the same, said suction line valve being released from the reciprocating means in advance of the opening of the compressed air valve whereby to clear the perforations of the head after each suction of the juice therethrough.

10. A fruit juice extractor comprising in combination, a rotating member, cups for holding sections of the fruit carried thereby, a perforated hollow reamer head engageable with the fruit during a predetermined period of the rotation of said member, suction means associated with the head for drawing the juices from the fruit into and through the head, stationary means engageable with the cups for rotating the cups during the period of its engagement by the head, and a plunger carried by the cups for ejecting the fruit after engagement by the head.

11. A fruit juice extractor comprising in combination, a rotating member, cups rotatably carried by the member for holding sections of the fruit, a perforated hollow reamer head engageable with the fruit during a predetermined period of the rotation of said member, suction means associated with the head for drawing the juices into and through the head, gears attached to the cup, a stationary rack disposed in the path of movement of the gears and adapted to rotate the cups during the period of their engagement with the head and spring retracted plungers carried by the cups and engageable with a projection carried by the stationary rack for ejecting the fruit from the cups.

In testimony whereof I affix my signature.

GEORGE W. EDWARDS.